(12) United States Patent
Akuzawa et al.

(10) Patent No.: US 10,003,128 B2
(45) Date of Patent: Jun. 19, 2018

(54) RESONANT TYPE POWER TRANSMISSION ANTENNA DEVICE

(71) Applicant: MITSUBISHI ELECTRIC ENGINEERING COMPANY, LIMITED, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: MITSUBISHI ELECTRIC ENGINEERING COMPANY, LIMITED, Chiyoda-ku (JP)

( * ) Notice: Subject to any disclaimer, the term of this patent is extended or adjusted under 35 U.S.C. 154(b) by 109 days.

(21) Appl. No.: 15/103,974

(22) PCT Filed: Dec. 26, 2013

(86) PCT No.: PCT/JP2013/084834
§ 371 (c)(1),
(2) Date: Jun. 13, 2016

(87) PCT Pub. No.: WO2015/097806
PCT Pub. Date: Jul. 2, 2015

(65) Prior Publication Data
US 2016/0315383 A1 Oct. 27, 2016

(51) Int. Cl.
*H01Q 1/52* (2006.01)
*H02J 50/70* (2016.01)
(Continued)

(52) U.S. Cl.
CPC .......... *H01Q 1/526* (2013.01); *B60L 11/182* (2013.01); *H01Q 3/26* (2013.01); *H01Q 7/00* (2013.01);
(Continued)

(58) Field of Classification Search
CPC .......... H01Q 21/00; H01Q 21/28; H01Q 1/52; H01Q 1/526; H01Q 3/26; H01Q 7/00;
(Continued)

(56) References Cited

U.S. PATENT DOCUMENTS

2009/0271048 A1* 10/2009 Wakamatsu ............ G06F 1/266
700/296
2010/0104031 A1 4/2010 Lacour
(Continued)

FOREIGN PATENT DOCUMENTS

JP 2002-185247 A 6/2002
JP 2005-312285 A 11/2005
(Continued)

OTHER PUBLICATIONS

Japanese Office Action dated Feb. 28, 2017 in Patent Application No. 2015-554396 (with English Translation).
(Continued)

*Primary Examiner* — Hoang Nguyen
(74) *Attorney, Agent, or Firm* — Oblon, McClelland, Maier & Neustadt, L.L.P.

(57) ABSTRACT

Disclosed is a resonant type power transmission antenna device provided with a plurality of transmission antennas 12 and a plurality of reception antennas 13, the resonant type power transmission antenna device including a transmission shield antenna 22 arranged between the plurality of transmission antennas 12, a reception shield antenna 23 arranged between the plurality of reception antennas 13, transmission and reception circuits 21 and 24 to operate the transmission and reception shield antennas 22 and 23 in electromagnetic field resonance having a phase opposite to that of the transmission and reception antennas 12 and 13 respectively adjacent to the transmission and reception shield antennas.

6 Claims, 8 Drawing Sheets

(51) Int. Cl.
*H02J 50/05* (2016.01)
*H02J 7/00* (2006.01)
*H02J 5/00* (2016.01)
*H01Q 3/26* (2006.01)
*H01Q 7/00* (2006.01)
*H01Q 21/00* (2006.01)
*B60L 11/18* (2006.01)
*H02J 50/12* (2016.01)
*H02J 50/40* (2016.01)

(52) U.S. Cl.
CPC ............. *H01Q 21/00* (2013.01); *H02J 5/005* (2013.01); *H02J 7/00* (2013.01); *H02J 50/05* (2016.02); *H02J 50/12* (2016.02); *H02J 50/40* (2016.02); *H02J 50/70* (2016.02); *B60L 2270/147* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .. H02J 5/005; H02J 50/05; H02J 50/12; H02J 50/40; H02J 50/70; H02J 7/00; H01F 38/00; H01F 38/14
See application file for complete search history.

(56) References Cited

U.S. PATENT DOCUMENTS

| | | | | |
|---|---|---|---|---|
| 2011/0018496 A1* | 1/2011 | Kozakai | ............... | H02J 7/0042 320/108 |
| 2011/0254377 A1* | 10/2011 | Wildmer | ............... | B60L 11/182 307/104 |
| 2011/0309689 A1* | 12/2011 | Kamata | ................... | H02J 5/005 307/104 |
| 2012/0080957 A1* | 4/2012 | Cooper | ................... | H02J 5/005 307/104 |
| 2012/0086281 A1* | 4/2012 | Kanno | .................... | H02J 5/005 307/82 |
| 2012/0235508 A1* | 9/2012 | Ichikawa | ................ | H02J 50/40 307/104 |
| 2012/0306262 A1 | 12/2012 | Taguchi | | |
| 2013/0038281 A1 | 2/2013 | Sakakibara et al. | | |
| 2013/0057205 A1* | 3/2013 | Lee | .......................... | H02J 5/005 320/108 |
| 2013/0099586 A1* | 4/2013 | Kato | ....................... | H02J 7/025 307/104 |
| 2013/0234530 A1* | 9/2013 | Miyauchi | ................ | H02J 5/005 307/104 |
| 2014/0253029 A1 | 9/2014 | Uchida et al. | | |
| 2014/0295703 A1 | 10/2014 | Nagashima | | |

FOREIGN PATENT DOCUMENTS

| | | | | | |
|---|---|---|---|---|---|
| JP | | 2007-267577 | A | 10/2007 | |
| JP | | 2009-303316 | A | 12/2009 | |
| JP | | 2010-523030 | A | 7/2010 | |
| JP | | 2011-234496 | A | 11/2011 | |
| JP | | 2012-39815 | A | 2/2012 | |
| JP | | 2012-248747 | A | 12/2012 | |
| JP | | 2013-143846 | A | 7/2013 | |
| JP | | 2013143846 | A * | 7/2013 | ............. H02J 17/00 |
| WO | WO | 2012/046453 | A1 | 4/2012 | |
| WO | WO | 2013/080285 | A1 | 6/2013 | |
| WO | WO | 2013/089160 | A1 | 6/2013 | |

OTHER PUBLICATIONS

International Search Report dated Mar. 18, 2014 in PCT/JP2013/084834 filed Dec. 26, 2013.

* cited by examiner (a)

(b)

(a)

(b)

(a)

(b)

(a)

(b)

RESONANT TYPE POWER TRANSMISSION ANTENNA DEVICE

FIELD OF THE INVENTION

The present invention relates to a resonant type power transmission antenna device that has an electromagnetic field shielding effect.

BACKGROUND OF THE INVENTION

A conventional shield device in a resonant type noncontact power supply system is shown in FIG. 8. In this shield device, in order to provide an electromagnetic field shielding effect, a transmission coil (transmission antenna) 101 and a reception coil (reception antenna) 102 are covered by shielding members 103 and 104, respectively.

RELATED ART DOCUMENT

Patent Reference

Patent reference 1: Japanese Unexamined Patent Application Publication No. 2012-248747

SUMMARY OF THE INVENTION

Problems to be Solved by the Invention

However, because the space between the transmission antenna 101 and the reception antenna 102 cannot be configured so as to have a shielding structure in the conventional configuration, the electromagnetic field generated from the transmission antenna 101 cannot be shielded. Therefore, a problem is that a leakage electromagnetic field occurs from the above-mentioned space.

The present invention is made in order to solve the above-mentioned problem, and it is therefore an object of the present invention to provide a resonant type power transmission antenna device that can provide an electromagnetic field shielding effect also in the space part between the transmission and reception antennas.

Means for Solving the Problem

According to the present invention, there is provided a resonant type power transmission antenna device provided with a plurality of first transmission antennas and a plurality of first reception antennas, the resonant type power transmission antenna device including: a second transmission antenna arranged between the plurality of first transmission antennas; a second reception antenna arranged between the plurality of first reception antennas; a transmission and reception circuit to operate the second transmission and reception antennas in electromagnetic field resonance having a phase opposite to that of the first transmission and reception antennas respectively adjacent to the second transmission and reception antennas.

Further, according to the present invention, there is provided a resonant type power transmission antenna device provided with a first transmission antenna and a first reception antenna, the resonant type power transmission antenna device including: a second transmission antenna arranged outwardly with respect to a power transmission direction of the first transmission antenna; a second reception antenna arranged outwardly with respect to a power transmission direction of the first reception antenna; and a transmission and reception circuit to operate the second transmission and reception antennas in electromagnetic field resonance having a phase opposite to that of the first transmission and reception antennas.

Advantages of the Invention

Because the resonant type power transmission antenna device according to the present invention is configured as above, the electromagnetic field shielding effect can be provided also for the space part between the transmission and reception antennas.

BRIEF DESCRIPTION OF THE FIGURES

FIG. 3(a) is a side view and FIG. 3(b) is cross-sectional view;

FIG. 4(a) is a side view and FIG. 4(b) is cross-sectional view;

FIG. 6(a) is a side view and FIG. 6(b) is cross-sectional view;

FIG. 7(a) is a side view and FIG. 7(b) is cross-sectional view.

EMBODIMENTS OF THE INVENTION

Hereafter, the preferred embodiments of the present invention will be explained in detail with reference to the drawings.

Embodiment 1.

Figure 1:
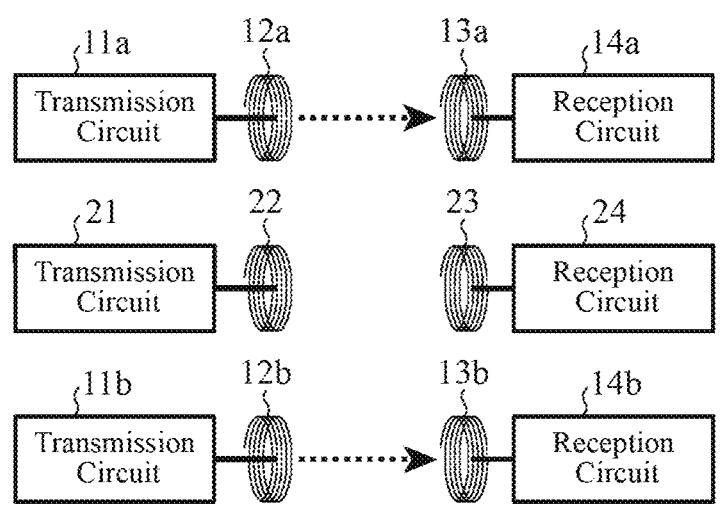
FIG. 1 is a diagram showing example of the configuration of a resonant type power transmission antenna device according to Embodiment 1 of the present invention.

In Embodiment 1, a case in which a plurality of antenna devices of a power transmission system are disposed is assumed, and a configuration of preventing mutual interference caused by an induced electromagnetic field between the antenna devices will be shown. FIG. 1 is a diagram showing the configuration of a resonant type power transmission antenna device according to Embodiment 1 of the present invention.

The resonant type power transmission antenna device is of a type in which transmission and reception units are disposed opposite to each other, and is configured with two or more antenna devices of the power transmission system, and an antenna device of a shield system, as shown in FIG. 1. In the example of FIG. 1, a case in which two antenna devices of the power transmission system are disposed is shown, and suffixes a and b are added to reference numerals denoting their functional units, respectively.

Each of the antenna devices of the power transmission system is configured with a transmission circuit 11, a transmission antenna (first transmission antenna) 12, a reception antenna (second reception antenna) and a reception circuit 14, as shown in FIG. 1.

The transmission circuit 11 establishes a resonance condition of the transmission antenna 12 according to resonance impedance control.

The transmission antenna 12 performs wireless transmission of electric power including an electric signal supplied thereto via the transmission circuit 11 to the reception antenna 13.

The reception antenna 13 receives the electric power from the transmission antenna 12. The electric power received by this reception antenna 13 is supplied to load equipment or the like (not shown) via the reception circuit 14.

The reception circuit 14 is arranged between the reception antenna 13 and the load equipment or the like, and establishes a resonance condition of the reception antenna 13 according to resonance impedance control.

A wireless transmission method which the antenna devices of the power transmission system use is not limited particularly, and can be any one of a method according to magnetic-field resonance, a method according to electric-field resonance, and a method according to electromagnetic induction.

The antenna device of the shield system is configured with a transmission circuit 21, a transmission shield antenna (second transmission antenna) 22, a reception shield antenna (second reception antenna) 23, and a reception circuit 24, as shown in FIG. 1.

The transmission circuit 21 establishes a resonance condition of the transmission shield antenna 22 according resonance impedance control.

The transmission shield antenna 22 is arranged between the transmission antennas 12 of the power transmission system, and performs wireless transmission of electric power including an electric signal supplied thereto via the transmission circuit 21 to the reception shield antenna 23.

The reception shield antenna 23 is arranged between the reception antennas 13 of the power transmission system, and receives the electric power from the transmission shield antenna 22.

The reception circuit 24 is arranged as a stage following the reception shield antenna 23, and establishes a resonance condition of the reception shield antenna 23 according to resonance impedance control.

The transmission and reception circuits 21 and 24 operate the transmission and reception shield antennas 22 and 23 in electromagnetic field resonance having a phase opposite to that of the transmission and reception antennas 12 and 13 respectively adjacent to the transmission and reception shield antennas. As a result, the induced electromagnetic field from the antenna devices of the power transmission system can be canceled out by the electromagnetic field from the antenna device of the shield system, and the mutual interference caused by the induced electromagnetic field between the antenna devices of the power transmission system can be prevented.

The closer the intensity of the electromagnetic field radiated from the antenna device of the shield system is brought into those of the electromagnetic fields radiated from the antenna devices of the power transmission system in order to cancel out the electromagnetic fields, the greater shielding effect is provided.

Further, the wireless transmission method which the antenna device of the shield system uses is not limited particularly, and can be any one of a method according magnetic-field resonance, a method according to electric-field resonance, and a method according to electromagnetic induction.

As mentioned above, because the resonant type power transmission antenna device according to this Embodiment 1 is configured in such a way that the antenna device of the shield system is arranged between the antenna devices of the power transmission system, and the transmission and reception shield antennas 22 and 23 are made to operate in electromagnetic field resonance having a phase opposite to that of the transmission and reception antennas 12 and 13 respectively adjacent to the transmission and reception shield antennas, an electromagnetic field shielding effect can be provided also for the space part between the transmission and reception antennas 12 and 13, and the mutual interference caused by the induced electromagnetic field between the antenna devices of the power transmission system can be prevented.

Figure 8:
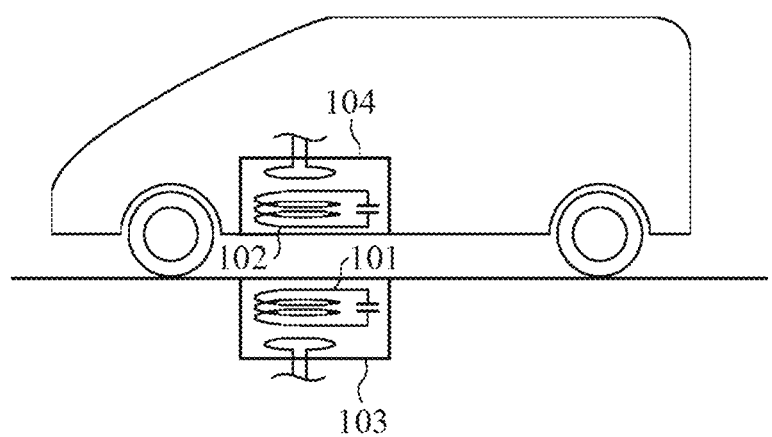
FIG. 8 is a diagram showing the configuration of a conventional shield device.

Further, in the conventional configuration shown in FIG. 8, it is necessary to ensure the gap between the transmission antenna 101 and the reception antenna 102 so that the power transmission efficiency does not degrade in the case in which the transmission antenna 101 and the reception antenna 102 are covered by the shielding members 103 and 104. Therefore, a problem is that the installation space cannot be reduced structurally. In contrast with this, because shielding members 103 and 104 like those disposed in the conventional configuration are not needed in the resonant type power transmission antenna device according to Embodiment 1, the resonant type power transmission antenna device can be configured at a low cost, in a small size, and in a lightweight.

Embodiment 2.

Figure 2:
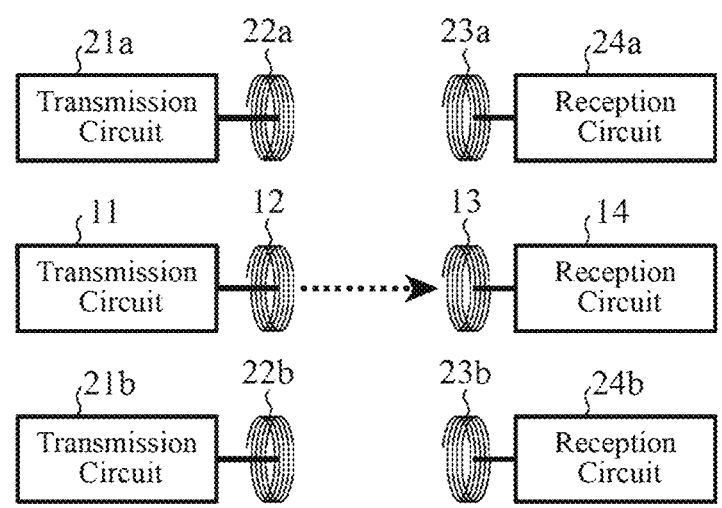
FIG. 2 is a diagram showing the configuration of a resonant type power transmission antenna device according to Embodiment 2 of the present invention.

In Embodiment 2, a configuration of shielding an induced electromagnetic field leaking outwardly with respect to a power transmission direction of an antenna device of a power transmission system will be shown. FIG. 2 is a diagram showing the configuration of a resonant type power transmission antenna device according to Embodiment 2 of the present invention.

The resonant type power transmission antenna device is of a type in which transmission and reception units are disposed opposite to each other, and is configured with the antenna device of the power transmission system, and at least one antenna device of a shield system, as shown in FIG. 2. In the example of FIG. 2, a case in which two antenna devices of the shield system are disposed is shown, and suffixes a and b are added to reference numerals denoting their functional units, respectively.

The antenna device of the power transmission system is comprised of a transmission circuit 11, a transmission antenna (first transmission antenna) 12, a reception antenna (second reception antenna) 13, and a reception circuit 14, as shown in FIG. 2. The configuration of the antenna device of this power transmission system is the same as that according to Embodiment 1 shown in FIG. 1, and the explanation of the configuration will be omitted hereafter.

Each of the antenna devices of the shield system is comprised of a transmission circuit 21, a transmission shield antenna (second transmission antenna) 22, a reception shield antenna (second reception antenna) 23, and a reception circuit 24, as shown in FIG. 2.

The transmission circuit 21 establishes a resonance condition of the transmission shield antenna 22 according to resonance impedance control.

The transmission shield antenna 22 is arranged outwardly with respect to the power transmission direction of the transmission antenna 12 of the power transmission system, and performs wireless transmission of electric power including an electric signal supplied thereto via the transmission circuit 21 to the reception shield antenna 23.

The reception shield antenna 23 is arranged outwardly with respect to the power transmission direction of the reception antenna 13 of the power transmission system, and receives the electric power from the transmission shield antenna 22.

The reception circuit 24 is arranged as a stage following the reception shield antenna 23, and establishes a resonance condition of the reception shield antenna 23 according to resonance impedance control.

The transmission and reception circuits 21 and 24 operate the transmission and reception shield antennas 22 and 23 in electromagnetic field resonance having a phase opposite to that of the transmission and reception antennas 12 and 13. As a result, the induced electromagnetic field from the antenna device of the power transmission system can be canceled out by the electromagnetic fields from the antenna devices of the shield system, and the mutual interference caused by the induced electromagnetic field leaking outside the antenna device of the power transmission system can be prevented.

The closer the intensities of the electromagnetic fields radiated from the antenna devices of the shield system are brought into that of the electromagnetic field radiated from the antenna device of the power transmission system in order to cancel out the electromagnetic field, the greater shielding effect is provided.

Further, the wireless transmission method which the antenna devices of the shield system use is not limited particularly, and can be any one of a method according magnetic-field resonance, a method according to electric-field resonance, and a method according to electromagnetic induction.

As mentioned above, because the resonant type power transmission antenna device according to this Embodiment 2 is configured in such a way that at least one antenna device of the shield system is arranged outwardly with respect to the power transmission direction of the antenna device of the power transmission system, and the transmission and reception shield antennas 22 and 23 are made to operate in electromagnetic field resonance having a phase opposite to that of the transmission and reception antennas 12 and 13, an electromagnetic field shielding effect can be provided also for the space part between the transmission and reception antennas 12 and 13, and the induced electromagnetic field leaking outside the antenna device of the power transmission system can be shielded. Further, because shielding members 103 and 104 like those disposed in the conventional configuration are not needed, the resonant type power transmission antenna device can be configured at a low cost, in a small size, and in a lightweight.

In Embodiment 1 the configuration in which the antenna device of the shield system is arranged between the antenna devices of the power transmission system to prevent the mutual interference caused by the induced electromagnetic field is shown, while in Embodiment 2 the configuration in which the antenna devices of the shield system are arranged outwardly with respect to the power transmission direction of the antenna device of the power transmission system to shield the induced electromagnetic field leaking outwardly is shown. In contrast with this, both the embodiments can be combined.

Embodiment 3.

Figure 3:
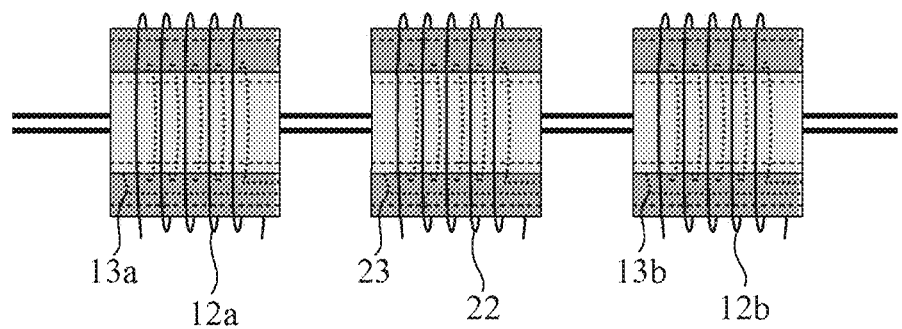
FIG. 3 is a diagram showing the configuration of a resonant type power transmission antenna device according to Embodiment 3 of the present invention.
Figure 3:
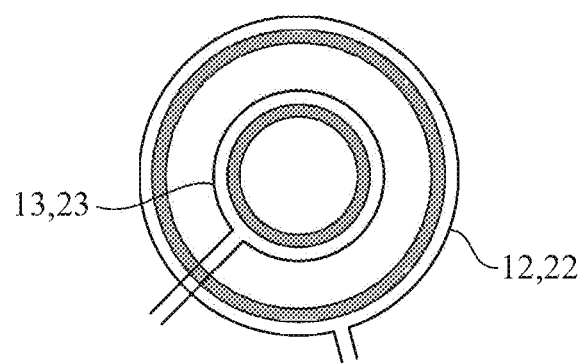

In Embodiment 1, the device in which the transmission and reception units are disposed opposite to each other is shown as the resonant type power transmission antenna device that prevents the mutual interference caused by the induced electromagnetic field between the antenna devices of the power transmission system. In contrast with this, a device in which transmission and reception units are engaged with each other can be applied, as shown in FIG. 3. More specifically, a transmission antenna 12 and a reception antenna 13 are arranged while being engaged with each other, and a transmission shield antenna 22 and a reception shield antenna 23 are arranged while being engaged with each other. The illustration of transmission and reception circuits 11, 14, 21 and 24 is omitted in FIG. 3. Further, coils which construct the transmission and reception antennas 12 and 13 and the transmission and reception shield antennas 22 and 23 are wound in, for example, a helical or spiral form.

Even in the case in which the resonant type power transmission antenna device, as shown in FIG. 3, in which the transmission and reception units are engaged with each other is used, the mutual interference caused by the induced electromagnetic field between the antenna devices of the power transmission system can be prevented, and the same advantages as those provided by Embodiment 1 can be provided.

Embodiment 4.

Figure 4:
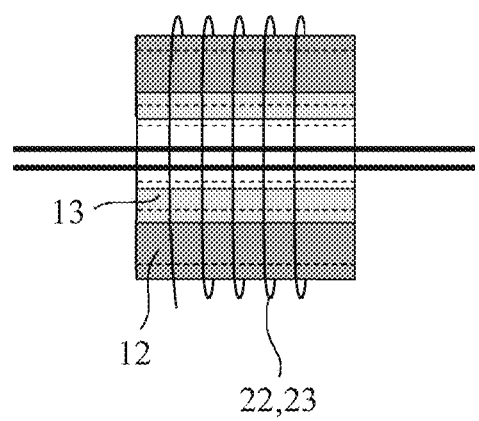
FIG. 4 is a diagram showing the configuration of a resonant type power transmission antenna device according to Embodiment 4 of the present invention.
Figure 4:
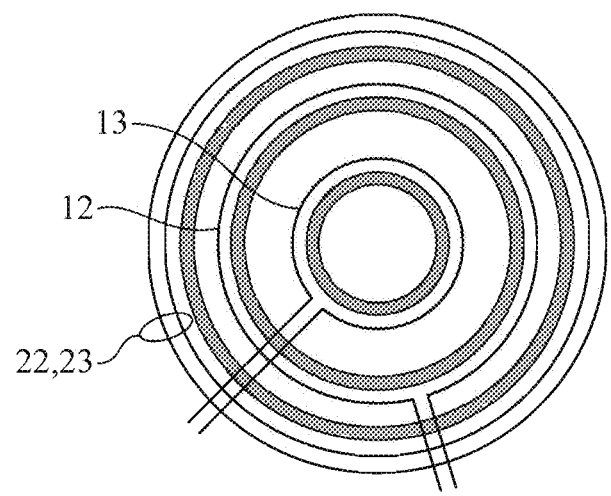

In Embodiment 2, the device in which the transmission and reception units are disposed opposite to each other is shown as the resonant type power transmission antenna device that shields the induced electromagnetic field leaking outwardly with respect to the power transmission direction of the antenna device of the power transmission system. In contrast with this, a device in which transmission and reception units are engaged with each other can be applied, as shown in FIG. 4. More specifically, a transmission antenna 12, a reception antenna 13, a transmission shield antenna 22 and a reception shield antenna 23 are arranged while being engaged with one another. The illustration of transmission and reception circuits 11, 14, 21 and 24 is omitted in FIG. 4. Further, coils which construct the transmission and reception antennas 12 and 13 and the transmission and reception shield antennas 22 and 23 are wound in, for example, a helical or spiral form.

Even in the case in which the resonant type power transmission antenna device, as shown in FIG. 4, in which the transmission and reception units are engaged with each other is used, the induced electromagnetic field leaking outwardly with respect to the power transmission direction of the antenna device of the power transmission system can be shielded, and the same advantages as those provided by Embodiment 2 can be provided.

In Embodiment 3 the configuration in which the antenna device of the shield system is arranged between the antenna devices of the power transmission system to prevent the mutual interference caused by the induced electromagnetic field is shown, while in Embodiment 4 the configuration in which the antenna device of the shield system is arranged outwardly with respect to the power transmission direction of the antenna device of the power transmission system to shield the induced electromagnetic field leaking outwardly is shown. In contrast with this, both the embodiments can be combined.

Embodiment 5.

Figure 5:
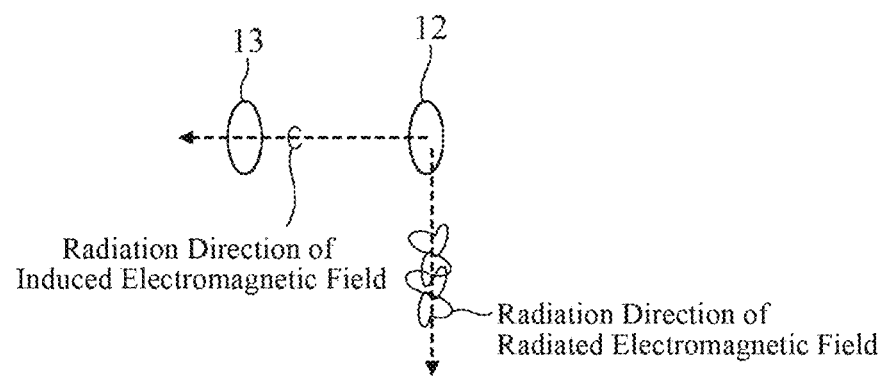
FIG. 5 is a diagram showing the radiation directions of an induced electromagnetic field and a radiated electromagnetic field which are generated from the antenna device.

In Embodiments 1 to 4, the configuration of providing the electromagnetic field shielding effect for the induced electromagnetic field is shown. On the other hand, in the leakage electromagnetic field generated from each antenna device of the power transmission system, there exists a radiated electromagnetic field in addition to the above-mentioned induced electromagnetic field. Then, as shown in FIG. 5, the radiation direction of the induced electromagnetic field, such as a Biot-Savart magnetic field, which is generated from each antenna device of the power transmission system differs from that of the radiated electromagnetic field by 90 degrees. Therefore, the radiated electromagnetic field cannot be shielded only by using the configuration shown in any one of Embodiments 1 to 4. To solve this problem, a configuration of providing an electromagnetic field shielding effect also for the radiated electromagnetic field will be shown in Embodiment 5.

Figure 6:
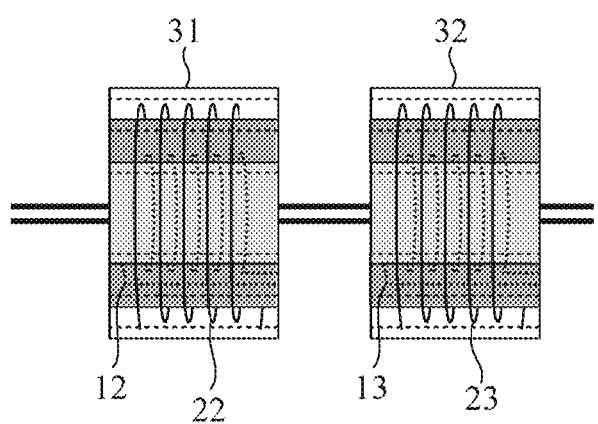
FIG. 6 is a diagram showing the configuration of a resonant type power transmission antenna device according to Embodiment 5 of the present invention.
Figure 6:
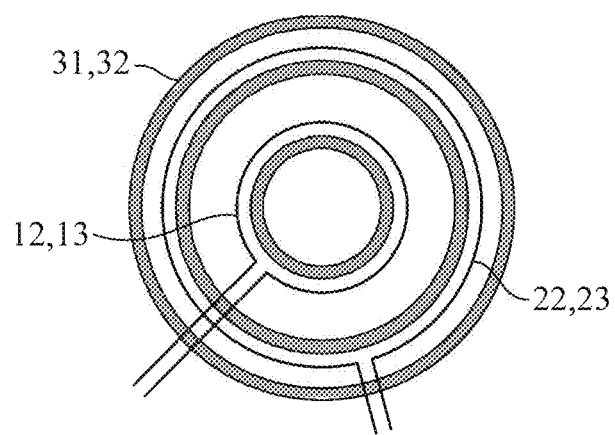

FIG. 6 is a diagram showing the configuration of a resonant type power transmission antenna device according to Embodiment 5 of the present invention. The resonant type power transmission antenna device according to Embodiment 5 shown in FIG. 6 is of a type in which transmission and reception units are disposed opposite to each other, and in which a transmission antenna 12 and a transmission shield antenna 22 are arranged while being engaged with each other, and a reception antenna 13 and a reception shield antenna 23 are arranged while being engaged with each other. The illustration of transmission and reception circuits 11, 14, 21 and 24 is omitted in FIG. 6. In Embodiment 5, shielding members 31 and 32 are further disposed outside the transmission shield antenna 22 and the reception shield antenna 23, respectively.

These shielding members 31 and 32 are members for shielding the radiated electromagnetic field, and are connected to a GND potential (connected to an RTN electric potential of the transmission antenna, a ground, or the like). As these shielding members 31 and 32, coils, tapes, sheet-shaped members, or the likes can be used. The shielding members 31 and 32 are disposed in such a way as to ensure gaps between themselves and the transmission and reception shield antennas 22 and 23, in order to prevent reduction in the power transmission efficiency of each of the antenna devices.

As mentioned above, because in the resonant type power transmission antenna device according to this Embodiment 5, the shielding members 31 and 32 connected to the GND potential, for shielding the radiated electromagnetic field are disposed outside the transmission and reception shield antennas 22 and 23 for shielding the induced electromagnetic field, dedicated shielding measures can be taken against the induced electromagnetic field and the radiated electromagnetic field whose radiation directions differ from each other, respectively, and hence the shielding effect on the leakage electromagnetic field can be further improved.

As the resonant type power transmission antenna device according to Embodiment 5, a shield wire of a coaxial cable having an internal structure as shown in FIG. 6 can be used. More specifically, a coaxial cable can construct a resonant type power transmission antenna device according to the present invention as long as the outside of the coaxial cable is shielded and the inside of the coaxial cable has a spiral structure.

Embodiment 6.

Figure 7:
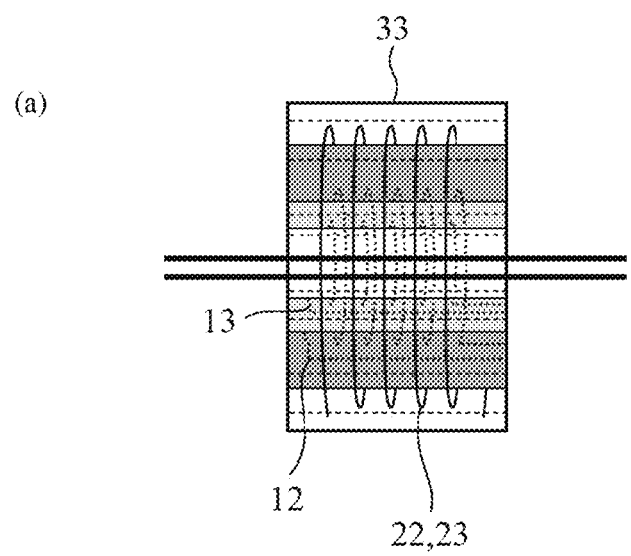
FIG. 7 is a diagram showing the configuration of a resonant type power transmission antenna device according to Embodiment 6 of the present invention.
Figure 7:
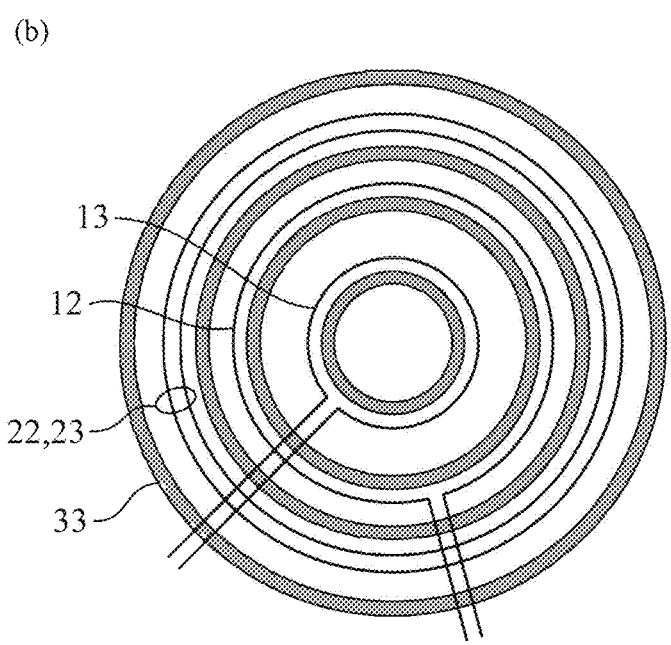

In Embodiment 5, the case in which the shielding members 31 and 32 are disposed outside the device of the type in which the transmission and reception units are disposed opposite to each other, and in which the transmission antenna 12 and the transmission shield antenna 22 are arranged while being engaged with each other, and the reception antenna 13 and the reception shield antenna 23 are arranged while being engaged with each other is shown. In contrast with this, a shielding member 33 can be disposed outside a device of a type in which transmission and reception units are engaged with each other, and in which transmission and reception antennas 12 and 13 and transmission and reception shield antennas 22 and 23 are arranged while being engaged with each other, as shown in FIG. 7. The shielding member 33 has the same structure as the shielding members 31 and 32 according to Embodiment 5.

Because dedicated shielding measures can be taken against the induced electromagnetic field and the radiated electromagnetic field whose radiation directions differ from each other, respectively, also in the resonant type power transmission antenna device shown in FIG. 7 of the type in which transmission and reception units are engaged with each other, the shielding effect on the leakage electromagnetic field can be further improved.

In addition, while the invention has been described in its preferred embodiments, it is to be understood that an arbitrary combination of two or more of the embodiments can be made, various changes can be made in an arbitrary component according to any one of the embodiments, and an arbitrary component according to any one of the embodiments can be omitted within the scope of the invention.

INDUSTRIAL APPLICABILITY

The resonant type power transmission antenna device according to the present invention can provide the electromagnetic field shielding effect also for the space part between the transmission and reception antennas, and is suitable for use as a resonant type power transmission antenna device or the like that has the electromagnetic field shielding effect.

EXPLANATIONS OF REFERENCE NUMERALS 11 transmission circuit, 12 transmission antenna (first transmission antenna), 13 reception antenna (first reception antenna), 14 reception circuit, 21 transmission circuit, 22 transmission shield antenna (second transmission antenna), 23 reception shield antenna (second reception antenna), 24 reception circuit, and 31 to 33 shielding member.

The invention claimed is:

1. A wireless power transmission device comprising:
   a power transmission antenna that transmits electric power;
   a power reception antenna that receives electric power from said power transmission antenna and supplies received electric power to a load equipment; and
   a shield antenna that generates electromagnetic fields having a phase opposite to said power transmission antenna and said power reception antenna,
   wherein said power transmission antenna is arranged inside a transmission side of said shield antenna; and
   said power reception antenna is arranged inside a reception side of said shield antenna.

2. The wireless power transmission device according to claim 1, wherein said power reception antenna is arranged inside said power transmission antenna, and
   a reception side of said shield antenna is arranged inside a transmission side of said shield antenna.

3. The wireless power transmission device according to claim 2, wherein a reception side of said shield antenna dose not supply electric power from a transmission side of said shield antenna to said load equipment.

4. The wireless power transmission device according to claim 2, further comprising a shielding member disposed outside a transmission side of said shield antenna.

5. The wireless power transmission device according to claim 1, wherein a reception side of said shield antenna dose not supply electric power from a transmission side of said shield antenna to said load equipment.

6. The wireless power transmission device according to claim 1, further comprising shielding members disposed outside a transmission and a reception side of said shield antenna.

* * * * *